United States Patent [19]

Farrell

[11] Patent Number: 5,066,048
[45] Date of Patent: Nov. 19, 1991

[54] WEIGHT SET CONNECTING MECHANISM FOR SUBSEA TUBULAR MEMBERS

[75] Inventor: Thomas J. Farrell, Houston, Tex.

[73] Assignee: Cooper Industries, Inc., Houston, Tex.

[21] Appl. No.: 498,825

[22] Filed: Mar. 26, 1990

[51] Int. Cl.⁵ .................................. F16L 55/07
[52] U.S. Cl. ................................. 285/18; 285/23; 285/86; 285/141; 285/321
[58] Field of Search ............... 285/18, 24, 141, 321, 285/921, 305, 922, 323, 319, 23, 86; 166/217, 207, 208, 344

[56]  References Cited
U.S. PATENT DOCUMENTS

| | | | |
|---|---|---|---|
| 3,489,221 | 1/1970 | Crain et al. | 166/290 |
| 4,355,825 | 10/1982 | Leicht | 285/3 |
| 4,372,584 | 2/1983 | Miller | 285/18 |
| 4,509,594 | 4/1985 | Milberger et al. | 166/208 |
| 4,534,583 | 8/1985 | Milberger et al. | 285/24 |
| 4,569,404 | 2/1986 | Milberger et al. | 166/217 X |
| 4,651,830 | 3/1987 | Crotwell | 166/338 |
| 4,697,828 | 10/1987 | Chou | 285/18 |
| 4,903,992 | 2/1990 | Jennings et al. | 285/24 |

Primary Examiner—Dave W. Arola
Assistant Examiner—Heather Chun

[57] ABSTRACT

An improved mechanism for connecting tubular members in a subsea well in which the members are locked together in a preloaded condition. In the preferred form of the invention the loading is provided by a series of fingers mounted on the inner tubular member and flexing through a restriction in the outer tubular member during landing and then springing back from such flexed position to engage and wedge against a tapered shoulder at the lower end of the restriction to both lock the inner tubular member in its seated position and also to provide the preloading desired. In a second form, the inner member is landed on a ring which is engaged on the outer tubular member landing seat and then further lowering of the inner member moves a wedge on the inner member to cause the upper end of the ring to engage the internal profile of the outer member and the lower end to engage a lower external profile on the inner member and to be wedged therein to create the lock down and the desired preload. A third form utilizes a lower split landing ring, an upper split latching ring and a resilient loading support sleeve therebetween with a wedge on the inner member to set the split latching ring, in place of the single ring of the second form. The third form operates on the same principle as the second form.

9 Claims, 12 Drawing Sheets

WEIGHT SET CONNECTING MECHANISM FOR SUBSEA TUBULAR MEMBERS

BACKGROUND

The present invention relates to an improved connecting mechanism which can be weight set for securing one tubular member within another in a preloaded condition within a subsea well.

Prior to the present invention the securing of one tubular member within another member in a subsea well involved the use of a pressure responsive actuator which moved a wedge or other shape into position to urge the latching mechanism into engagement within the internal profile of the outer tubular member. An example of this type of pressure responsive connecting structure is shown in U.S. Pat. No. 4,372,584 wherein abutting tubular members are connected by locking fingers of a locking sleeve. One end of the fingers is engaged in the flange of one tubular member and the other end is wedged outwardly into engagement with an internal flange on a sleeve extending from the other tubular member into surrounding relationship with the flanged end of the first tubular member. The locking fingers are wedged outwardly by a wedge sliding on the exterior of the first tubular member and move responsive to hydraulic pressure supplied to a fluid chamber defined between a ring secured to the first tubular member and the interior of the wedge. This disclosure does not suggest a connection in a subsea well but such connections do utilize hydraulically actuated wedges to force the locking element into the interior profile of the outer member. The R. L. Crain U.S. Pat. No. 3,489,221 is an example of such structure with the split ring being held in a recess on the exterior of the inner member and then released to move into the interior profile of the outer member and has a tapered surface to wedge it or lock it into such engagement to support the inner member from the outer member.

U.S. Pat. No. 4,355,825 discloses a mudline suspension system in which a split ring having slots cut vertically from the top and bottom is adapted to engage a shoulder on the interior of the exterior member and to have the interior member landed thereon. Another similarly designed ring is disclosed in U.S. Pat. Nos. 4,534,583 and 4,509,594. Both of these structures provide the ring to be interposed between the two members when landed.

U.S. Pat. No. 4,697,828 discloses a preloaded connection for a subsea well in which the inner member carries a lock ring and a wedging ring. The lock ring includes an upper outwardly extending flange which engages the top of the outer member and the lock ring also has a lower outwardly extending projection which is adapted to engage within an internal recess in the outer member. The wedging ring surrounds the inner tubular member and engages a downwardly facing flange thereon and is partially within the lock ring during lowering. Once landed the wedging ring is forced downwardly by a separate hydraulic tool to a position within the lock ring and causes its lower projection to be wedged into engagement within the outer member recess to provide a preloaded locked connection between the two members.

U.S. Pat. No. 4,651,830 discloses a latching connection for a wellhead housing within a conductor casing in a subsea wellhead in which a split latching and loading ring is set by downward movement of a wedge or cam into an internal groove in the conductor casing. A retrievable hydraulic actuator is used to move the wedging ring. The split ring transmits the load between the housing and the conductor casing and also latches them together to retain the housing on the seat within the conductor casing.

SUMMARY

The present invention discloses an improved mechanism for connecting tubular members in a subsea well in which the members are locked together in a preloaded condition. In the preferred form of the invention the loading is provided by a series of fingers mounted on the inner tubular member and flexing through a restriction in the outer tubular member during landing and then springing back from such flexed position to engage and wedge against a tapered shoulder at the lower end of the restriction to both lock the inner tubular member in its seated position and also to provide the preloading desired. In another form of the present invention the structure is landed on a ring which is engaged on the outer tubular member landing seat and then further lowering brings a wedge on the inner tubular member to cause the upper end of the ring to engage the internal profile of the outer tubular member and to be wedged therein to create the lock down and the desired preload.

An object of the present invention is to provide an improved connecting mechanism for tubular members in a subsea well which can be set by weight to a desired preloaded condition.

Another object is to provide an improved connecting mechanism for tubular members in a subsea well in which the desired preloaded condition is greater than the weight used to generate such preloaded condition.

A further object is to provide an improved connecting structure in which no separate hydraulic or other pressure type of actuator is used to provide the desired preload.

Still another object is to provide an improved connecting mechanism for a subsea well in which the landing, locking and preloading is provided by the simple lowering of the string.

BRIEF DESCRIPTION OF THE DRAWINGS

These and other objects and advantages of the present invention are hereinafter set forth and explained with respect to the drawings wherein.

DESCRIPTION OF THE PREFERRED EMBODIMENTS

Figure 2:
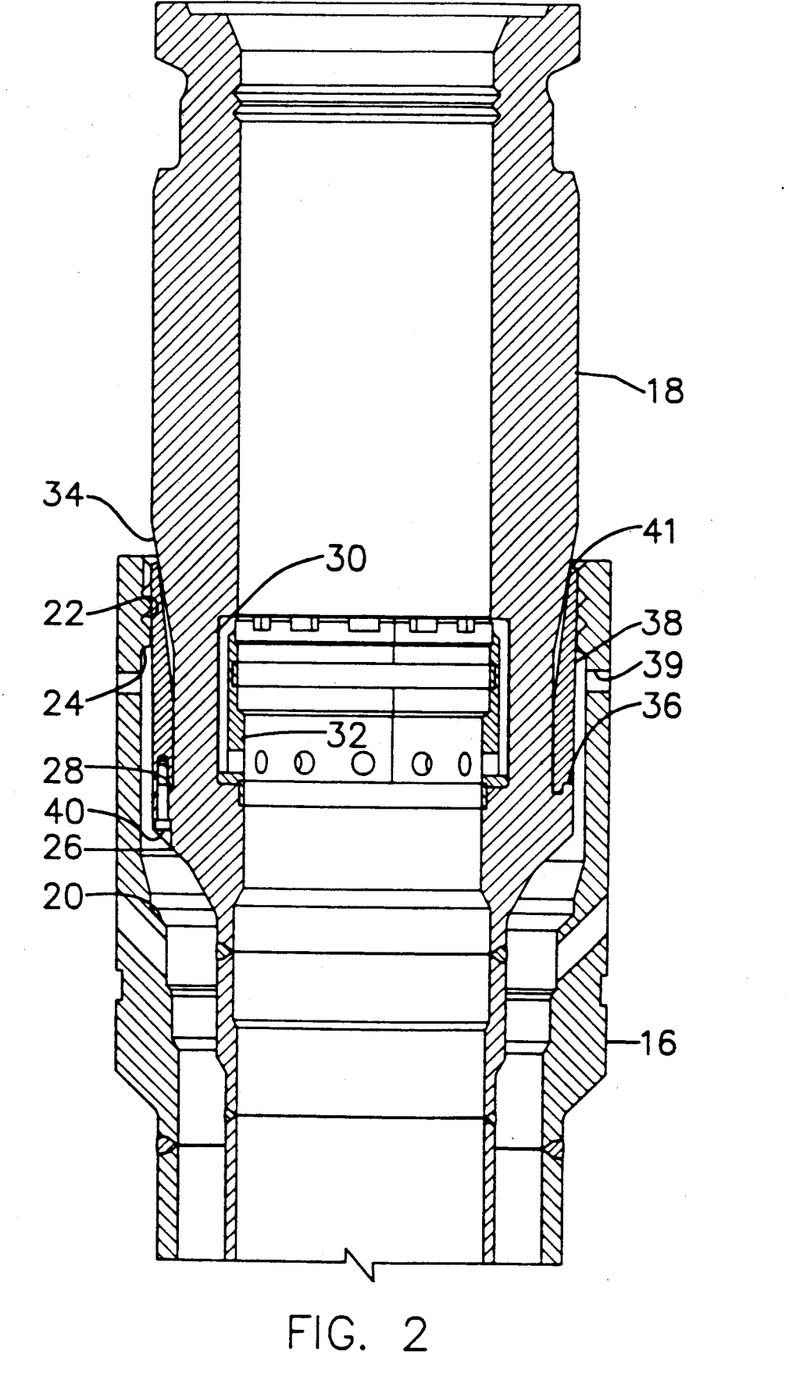
FIG. 2 is a similar sectional view of the mechanism as it moves within the outer tubular member.
Figure 3:
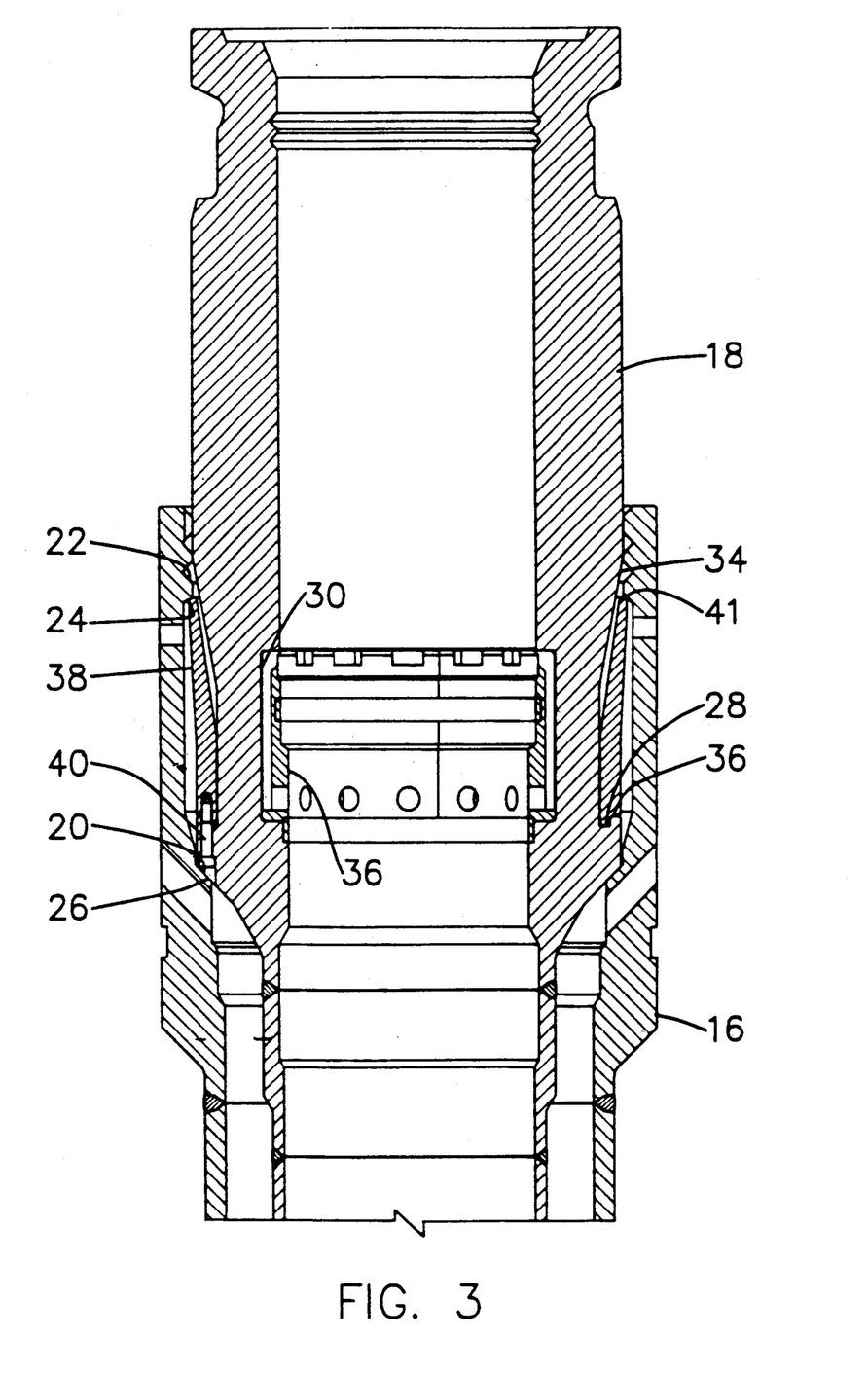
FIG. 3 is a similar sectional view of the mechanism after it has landed and been locked within the outer tubular member.
Figure 4:
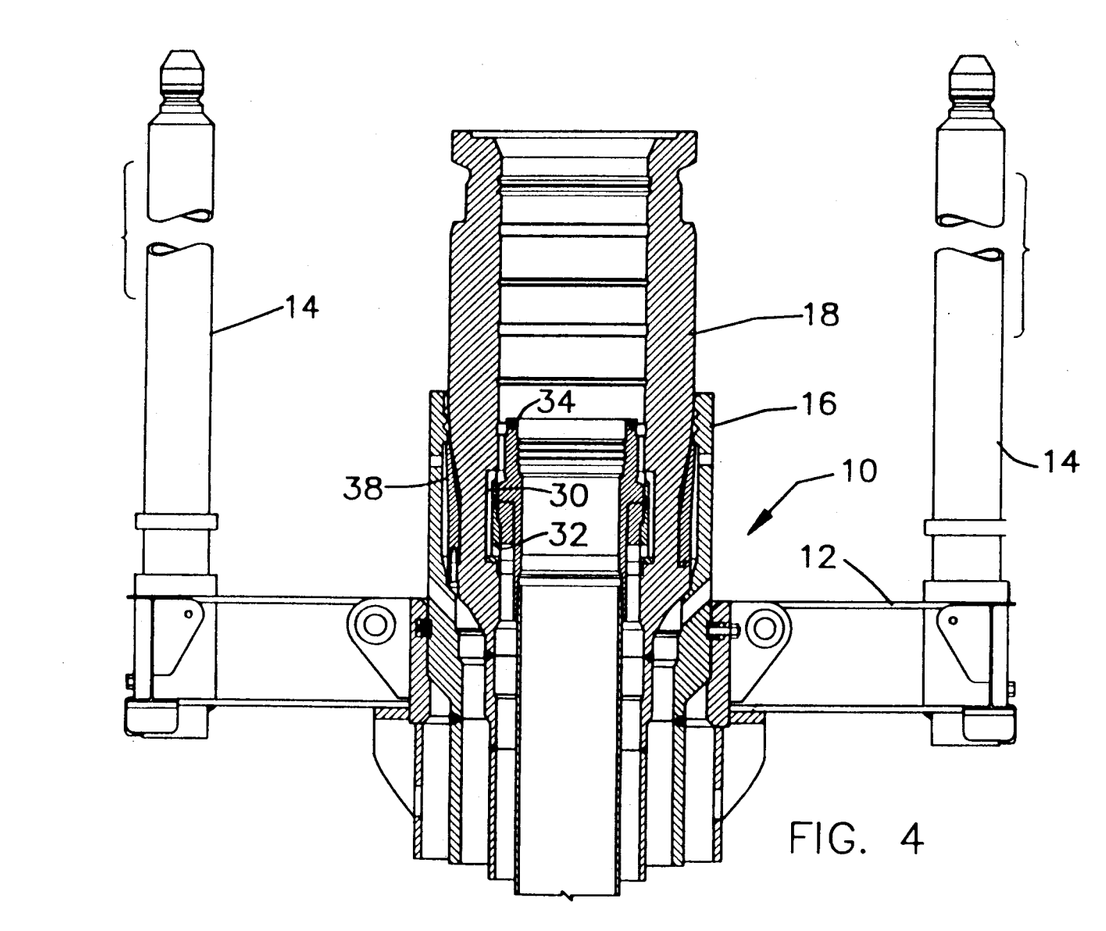
FIG. 4 is a vertical sectional view of a subsea well illustrating the position of the connecting mechanism with respect to the components of the subsea well.

The preferred form of the present invention is illustrated in FIG. 1 through 4 and discloses a subsea wellhead 10 with permanent guide base 12 positioned on the bottom of the body of water and having upstanding guide posts 14 which are used to land structure within the annular internal structure of guide base 12 as shown in FIG. 4. The large diameter housing 16 is run with guide base 12 and is secured therein as shown. This large diameter housing 16 would be a 30" housing and at the proper time a small housing 18, such as an 18¾" housing is lowered into, landed within and secured to large diameter housing 16 as hereinafter described.

Figure 1:
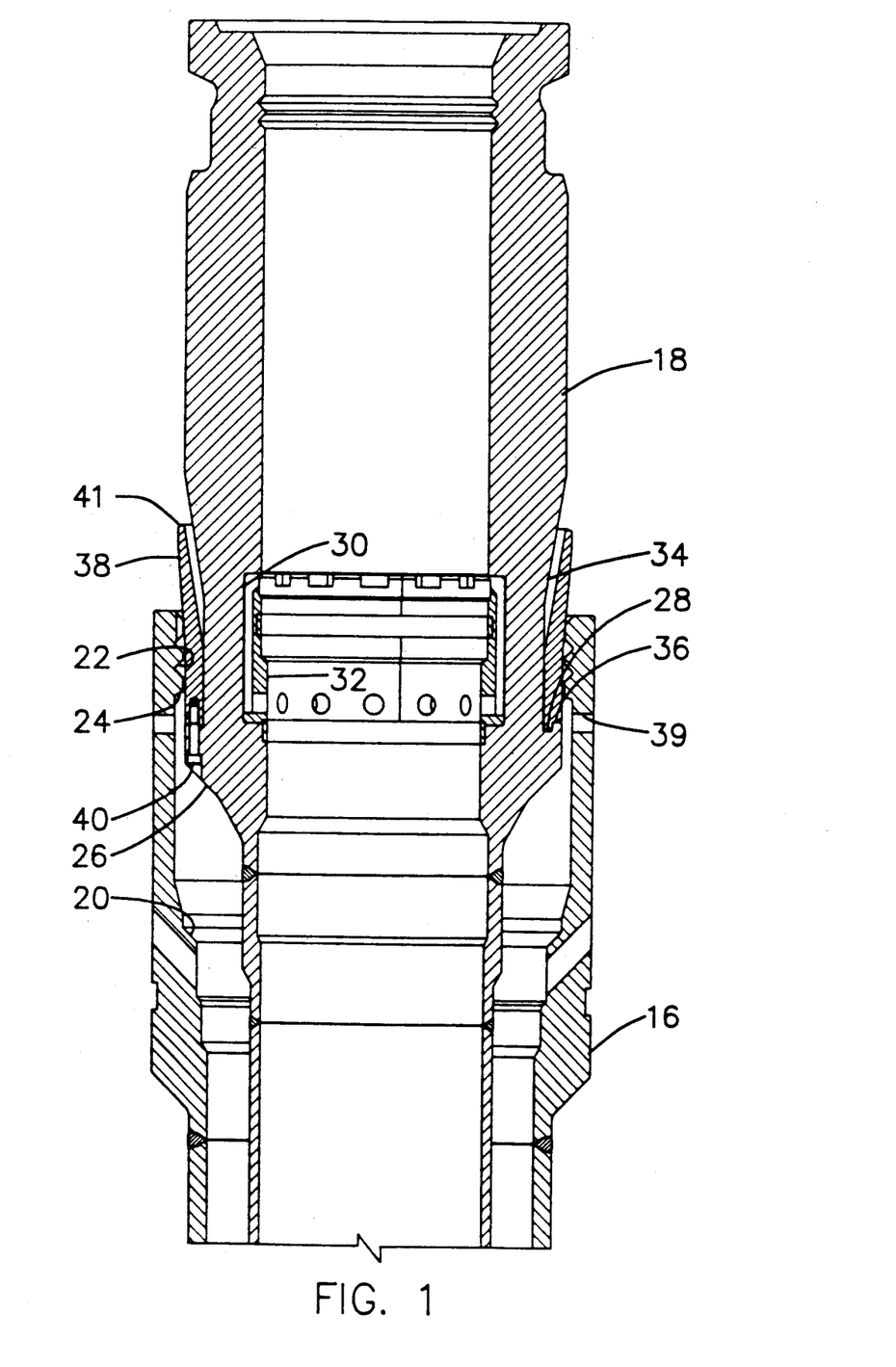
FIG. 1 is a vertical sectional view of the preferred form of connecting mechanism of the present invention illustrating the lowering of the mechanism and the inner tubular member into the outer tubular member in a subsea well.

In FIGS. 1, 2 and 3, the two housings 16 and 18 are shown without the surrounding structure of guide base 12 for purpose of clarity since such structure is illustrated in FIG. 4. In FIG. 1, housing 16 is in position and housing 18 is being lowered therein. Housing 16 has internal upwardly facing landing seat 20 and upper internal profile 22 with the lower portion of such profile 22 forming a tapered downwardly facing shoulder 24. Shoulder 24, as shown, tapers outwardly and downwardly. Housing 18 includes external downwardly facing landing shoulder 26 which is adapted to land on housing landing seat 20, upwardly facing external recess 28, internal recess 30 which receives high strength landing ring 32 on which subsequently run structure (not shown) may be landed and tapered surface 34 which is tapered downwardly and inwardly. Recess 28 includes outer upstanding rim 36. Suitable means is provided to secure the lower ends of fingers 38 with their lower ends positioned within recess 28 and, as illustrated, such securing means is provided by cap screws 40 as shown.

Fingers 38, which consist of an annular ring split vertically into an appropriate number of individual pieces, have a suitable shape so that they provide the means for latching housing 18 within housing 16 and also provide the desired preload in the connection of housings 18 and 16. Fingers 38 are therefore shaped to approximate a constant stress beam. The shape of fingers 38 is thick at their lower end and in the lower section for a short distance above recess 28. The upper ends of fingers 38 above the lower section have an upwardly decreasing thickness and also extend upwardly and radially outwardly away from tapered surface 34 of housing 18 as shown.

As can be seen in FIG. 1, the upper outer end of fingers 38 will not pass through interior profile 22 of outer housing 16 without being deflected inwardly. Thus as housing 18 is lowered within housing 16, fingers 38 are deflected inwardly and pass through the interior of profile 22 as shown in FIG. 2. Surface 34 of housing 18 is provided to allow the inward bending of fingers 38 as they pass through the interior profile 22 of outer housing without being permanently deformed. In the event of misalignment of housing 18 in housing 16 the fingers on the narrow side of the annulus will be supported by the surface 34 before they have been deflected past their elastic limit. When housing 18 has been lowered so that its landing shoulder 26 has landed and is firmly seated on landing seat 20 of housing 16, fingers 38 have moved through profile 22 and have their upper ends in engagement with shoulder 24. It should be noted that fingers 38 are preferred to engage shoulder 24 before the landing of housing 18 within housing 16 to accommodate manufacturing tolerances and the possible accumulation of deposits on shoulder 24. The deflection of fingers 38 in passing through profile 22 is within their normal elastic range and when the upper end of fingers 38 reach shoulder 24 they move outwardly with a return force which translates into an upward wedging force on shoulder 24 to cause a tension in housing 16 and this creates a compression in fingers 38 and in housing 18 between recess 28 and landing shoulder 26. Thus, fingers 38, by their engagement with shoulder 24 have latched housing 18 in position within housing 16 and have created the desired preload condition in the connection between the two housings. The magnitude of the preload can be greater than the axial loading supplied by the casing weight, if desired.

It should be noted that the upper ends of fingers 38 have tapered surface 41 which coacts with shoulder 24 in creating the desired preload for the connection between housings 16 and 18. Also, the edge between taper 41 and the finger outer diameter is rounded, as is the corresponding edge of housing 16, to prevent high stresses during connection. Openings 39 extend through housing 16 at a position immediate below shoulder 24 as shown to allow entry of pins or bolts, which may be part of a recovery tool (not shown) which can extend through openings 39 to move fingers 38 radially inward to a position in which the fingers 38 will clear restriction 22 during recovery of housing 18, if desired.

Figure 5:
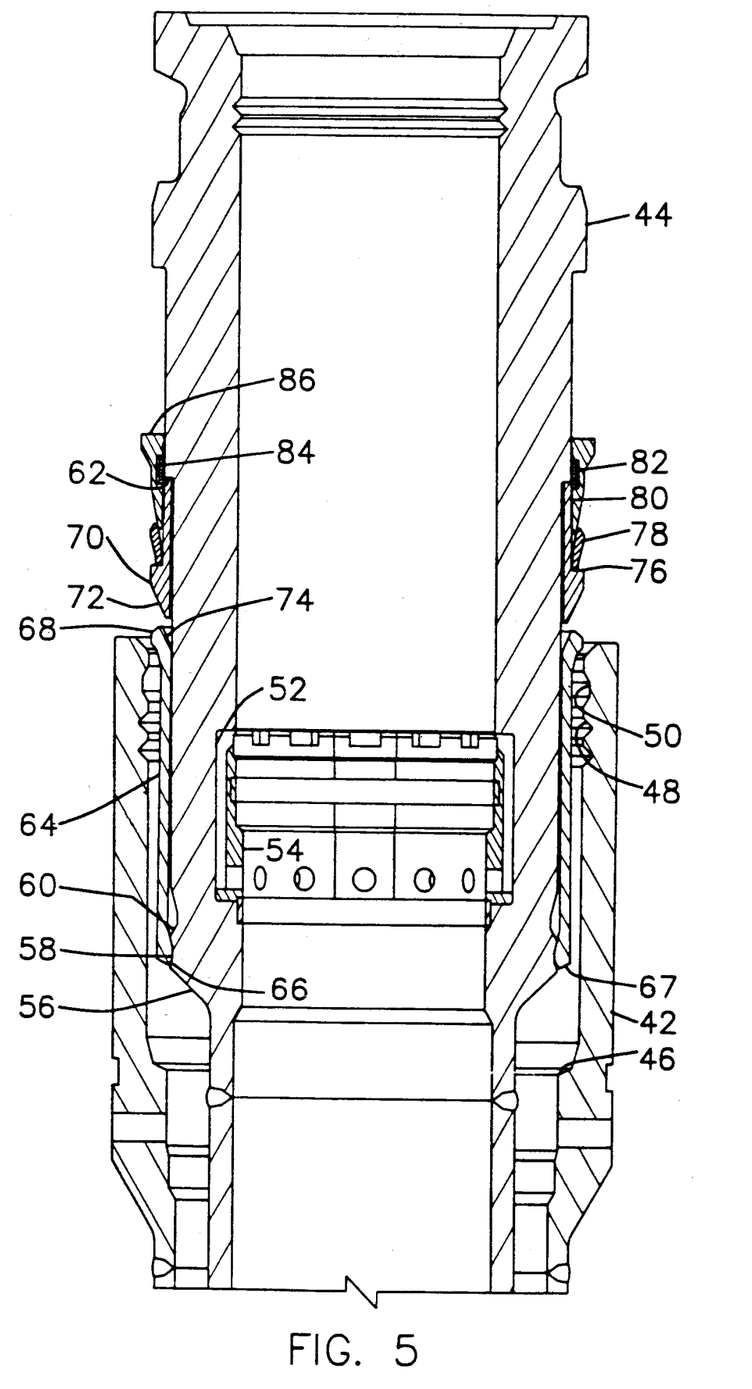
FIG. 5 is a vertical sectional view of a modified form of the connecting mechanism of the present invention as it is entering the outer tubular member.
Figure 5A:
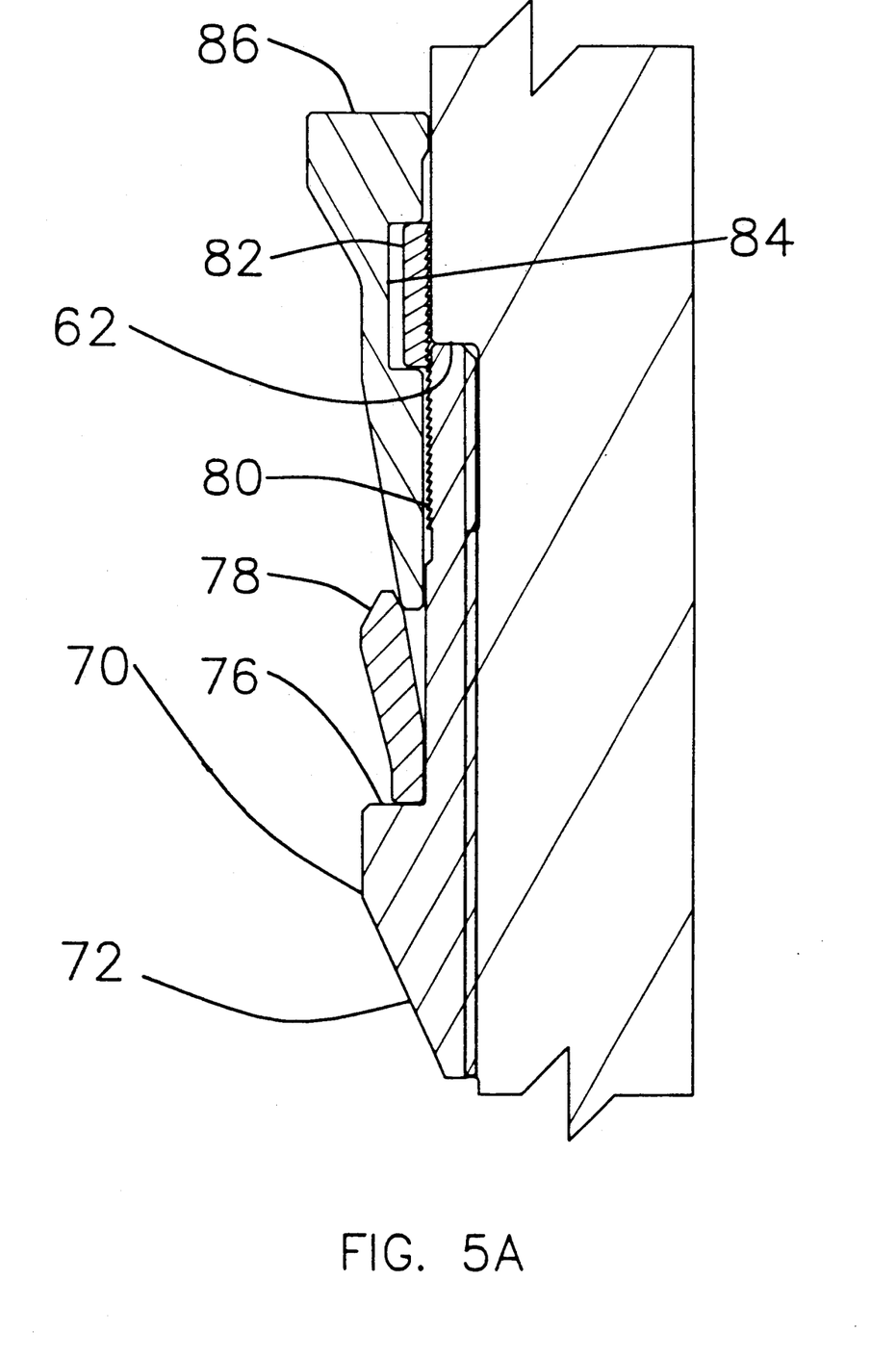
FIG. 5A is a partial sectional view illustrating the details of the secondary locking means.
Figure 6:
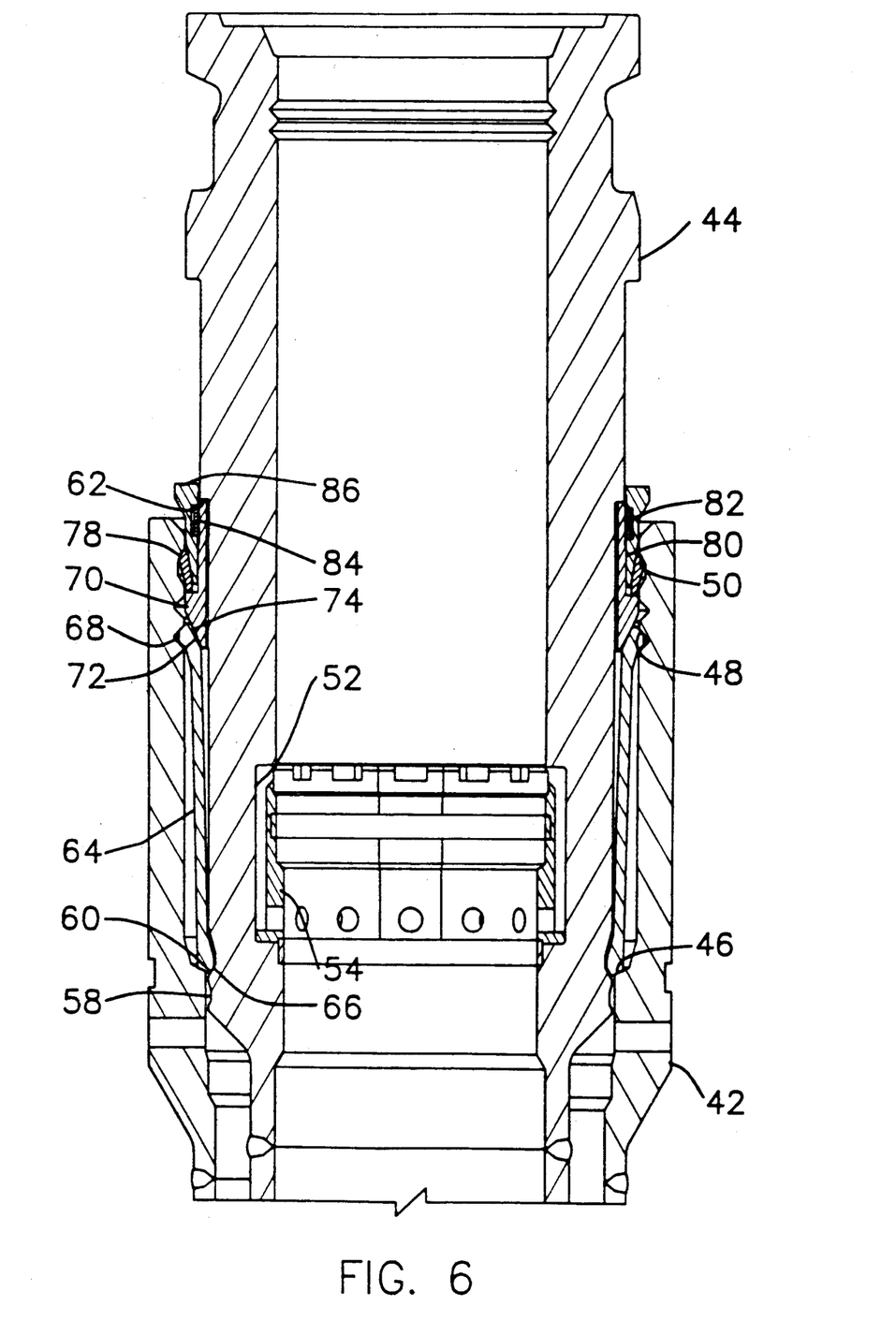
FIG. 6 is a similar sectional view of the mechanism of FIG. 5 after it has been landed and set in its locked position.
Figure 7:
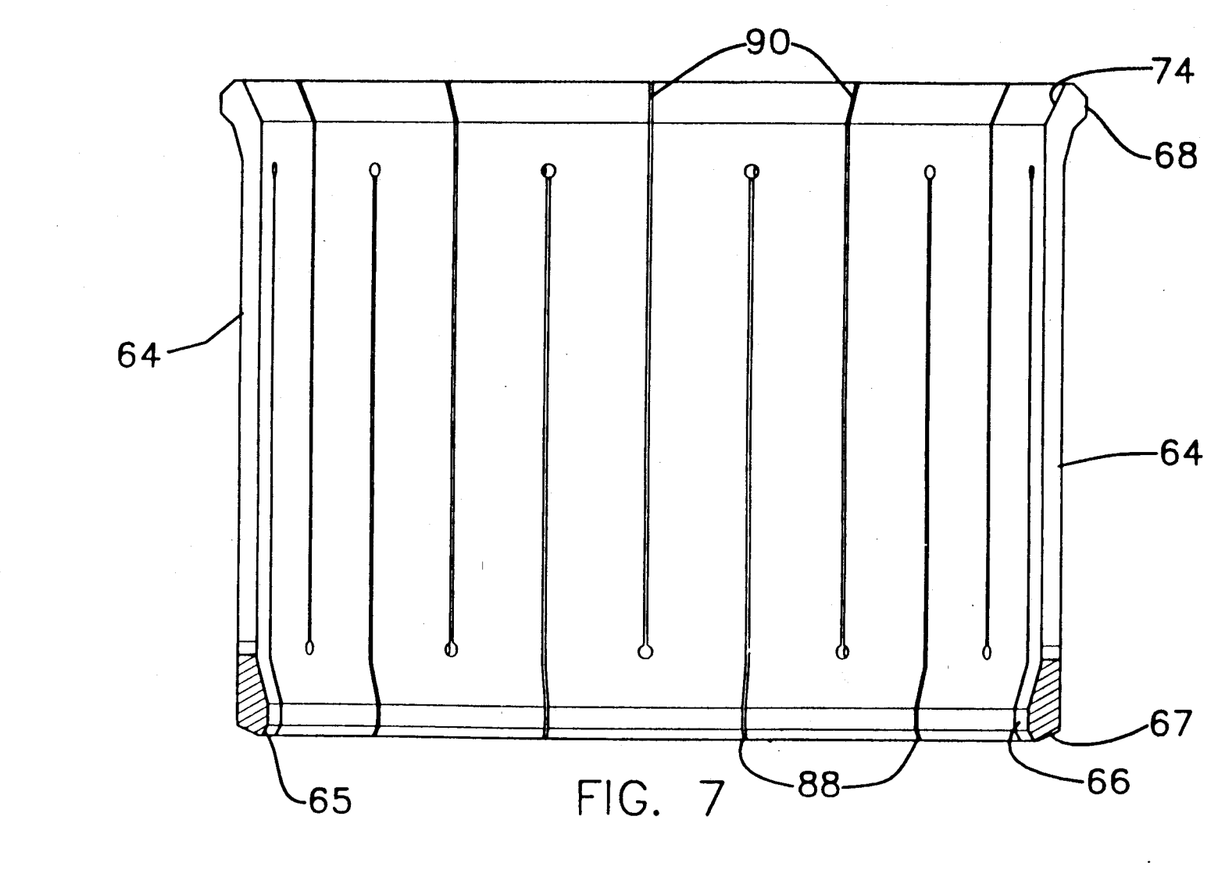
FIG. 7 is a sectional view of the landing and locking ring of &he mechanism shown in FIGS. 5 and 6.

In the modified form of the present invention shown in FIGS. 5, 6 and 7, outer housing 42 is shown independent of the remainder of the subsea well equipment as explained above with reference to the preferred form of the present invention. Inner housing 44 is being lowered therein in FIG. 5 and is landed, locked and preloaded as shown in FIG. 6. Outer housing 42 includes internal landing seat 46, upper internal profile 48, downwardly facing tapered shoulder 50 immediately above profile 48. Inner housing 44 includes inner recess 52 for receiving landing ring 54 which supports subsequently landed equipment (not shown), lower outer downwardly facing shoulder 56, first or lower annular recess 58 immediately above shoulder 56, second or upper annular recess 60 immediately above first recess 58 and external downwardly facing shoulder 62. Latch ring 64 includes lower inner projection 66 which engages within first or lower recess 58 on inner housing 44 during lowering, lower tapered landing surface 67, and upper outer projection 68 which is adapted to engage within profile 48 as hereinafter explained. First wedge ring 70 is positioned in surrounding relationship to the exterior of housing 44 immediately below shoulder 62. Wedge ring 70 includes lower external tapered surface 72 which tapers downwardly and inwardly and in operation engages within upper internal taper 74 in latch ring 64. Wedge ring 70 also includes upwardly facing shoulder 76 on which split latching ring 78 is positioned. Suitable threading 80 is provided on the exterior of wedge ring 70 above latching ring 78, as shown, to receive split ratcheting latch ring 82 which is positioned around the exterior of wedge ring 70 and within recess 84 on the interior of second wedge ring 86. Wedge ring 70, split latching ring 78 and second wedge ring 86 are shown in detail in FIG. 5A in their lowering position.

During the lowering of inner housing 44, the elements mounted thereon are positioned as shown in FIG. 5 and 5A and as previously described. When housing 44 enters within housing 42 sufficiently so that tapered shoulder 67 on the lower end of latch ring 64 engages landing seat 46 of housing 42, further lowering of housing 44 causes latch ring 64 to move upwardly on housing 44 so that its lower inner projection 66 moves out of first annular recess 58 and into second annular recess 60. Further upward movement of latch ring 64 on housing 44 is prevented by the engagement of surface 72 of wedge ring 70 with upper surface 74 on latch ring 64. The downward movement of housing 44 within latch ring 64 causes its upper end to be wedged outwardly by wedge ring 70 so that its external projection is forced into profile 48 with the lower end surface 67 being engaged on landing shoulder 46. Inner projection 66 is wedged into recess 60 by the action of string weight (multiplied by the wedging effect of surfaces 48 and 74) acting on shoulder 46. This creates the preload condition desired in the joining of housing 42 and 44, the geometry of the system being such that all four interfaces are being wedged together as housing 44 moves to its equilibrium position. This preload is locked in by virtue of the effective locking tapers between surfaces 72 and 74, 68 and 48, 67 and 46, and 66 and 60. This system of structures provides a mechanical advantage so that the preload force generated is greater than the magnitude of the setting force (i.e., casing weight) if desired.

Latch ring 64 is shown in FIG. 7 in sectional view to illustrate its preferred structural configuration. Latch ring 64 is annular or tubular in shape and includes lower inner projection 66 with outer tapered surface 67 and inner tapered surface 65 therebelow, upper external projection 68 and upper internal tapered surface 74. Latch ring 64 is preferred to have a serpentine configuration, i.e., it includes a plurality of slots 88 which extend from the lower surface of ring 64 and terminate short of the upper end thereof and a plurality of slots 90 alternating with slots 88. Slots 90 extend from the upper end of ring 64 and terminate short of the lower end thereof. The ends of slots 88 and 90 are rounded so that there are no sharp corners which might create a stress concentration. This slotting of latching ring 64 allows it to have the annular flexibility to be deformed into the landed and latched operating position as described above, and also to compress axially by virtue of meridional bending.

Figure 6A:
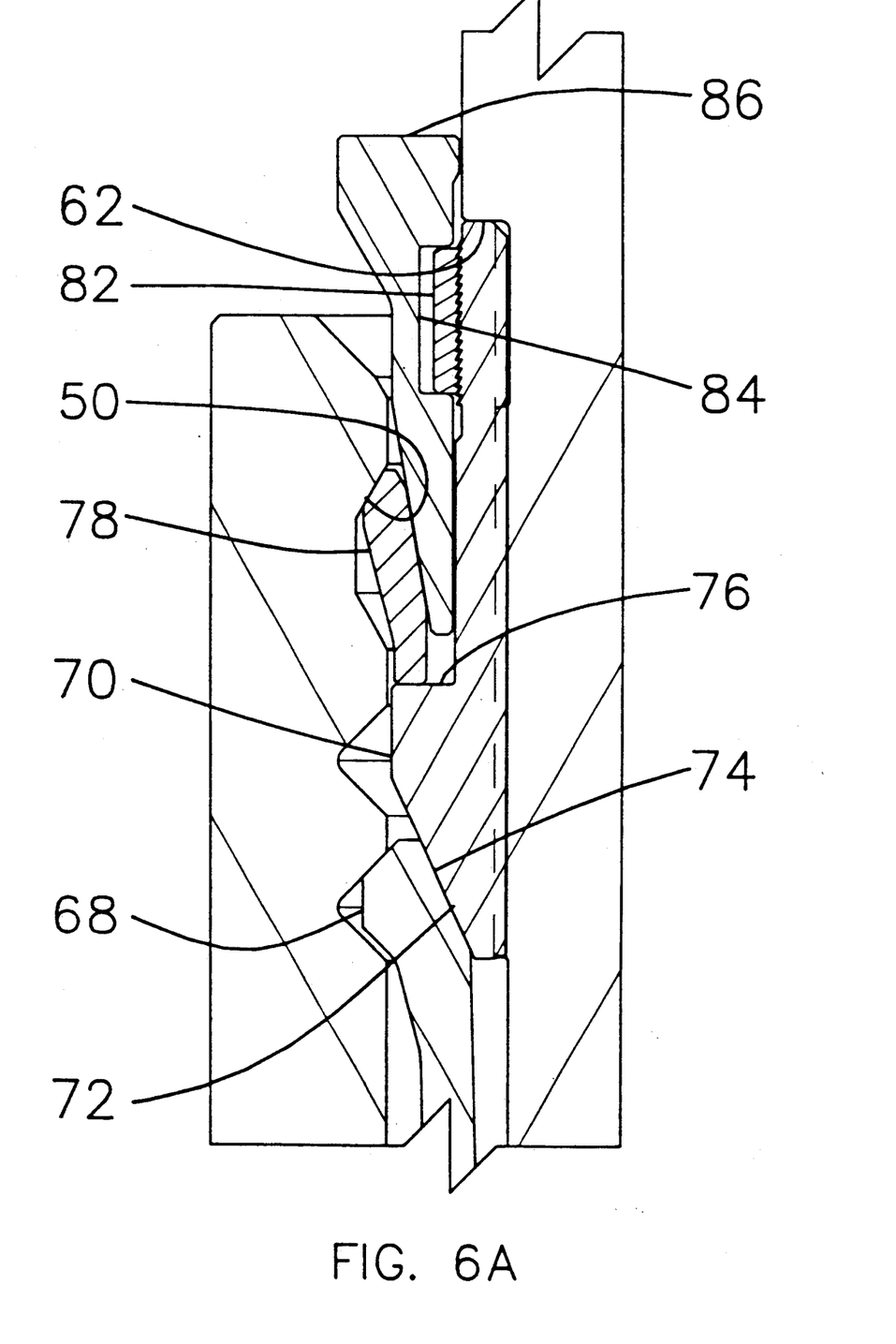
FIG. 6A is another partial sectional view of the details of the secondary locking means in set position.

A secondary locking means is provided to hold ring 64 and wedge ring 70 in their set positions under the influence of high tensile loads applied to housing 44. The housing running tool (not shown) is used to move second wedge ring 86 downwardly on housing 44 and split ratcheting latch ring 82 downwardly on threads 80 and causing wedge ring 86 to wedge within split latching ring 78 to move its upper end into engagement with upper internal shoulder 50. In this position ring 78 is fixed in position between shoulder 50 on the interior of housing 42 and shoulder 76 on the exterior of wedge ring 70 preventing relative movement of wedge ring 70 with respect to both housing 42 and latch ring 64. The force require to operate the secondary locking means is sufficiently minor so that it does not require a special hydraulic tool but a passive mechanism may be incorporated in the housing running tool release function. The geometry of the secondary locking means is such that tolerances are accommodated. It should be noted that prior to setting of the secondary lock, the connection may be disengaged by application of a upward overpull force on the inner member 44.

Figure 8:
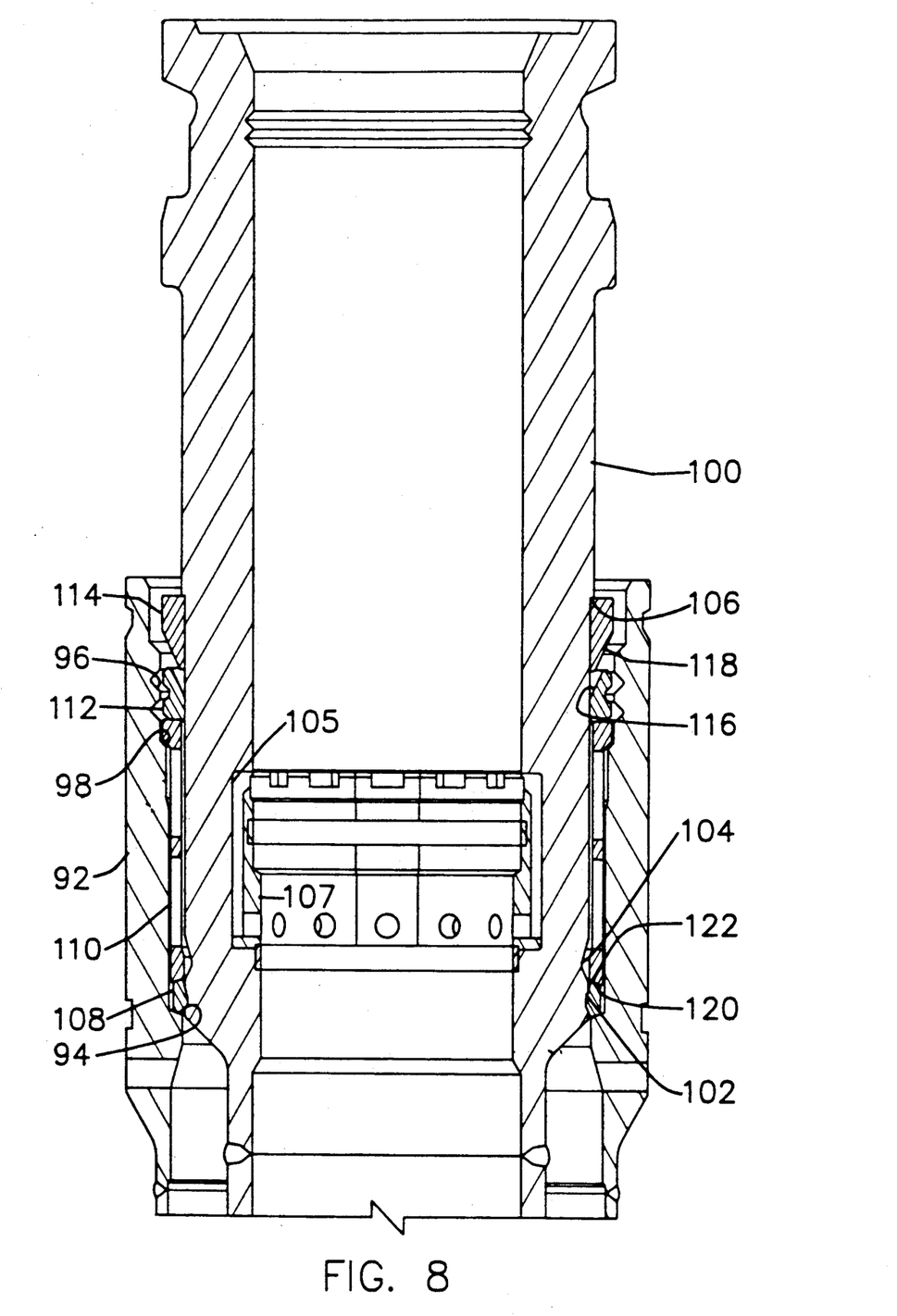
FIG. 8 is a vertical sectional view of another modified form of the connecting mechanism of the present invention as it is entering the outer tubular member
Figure 9:
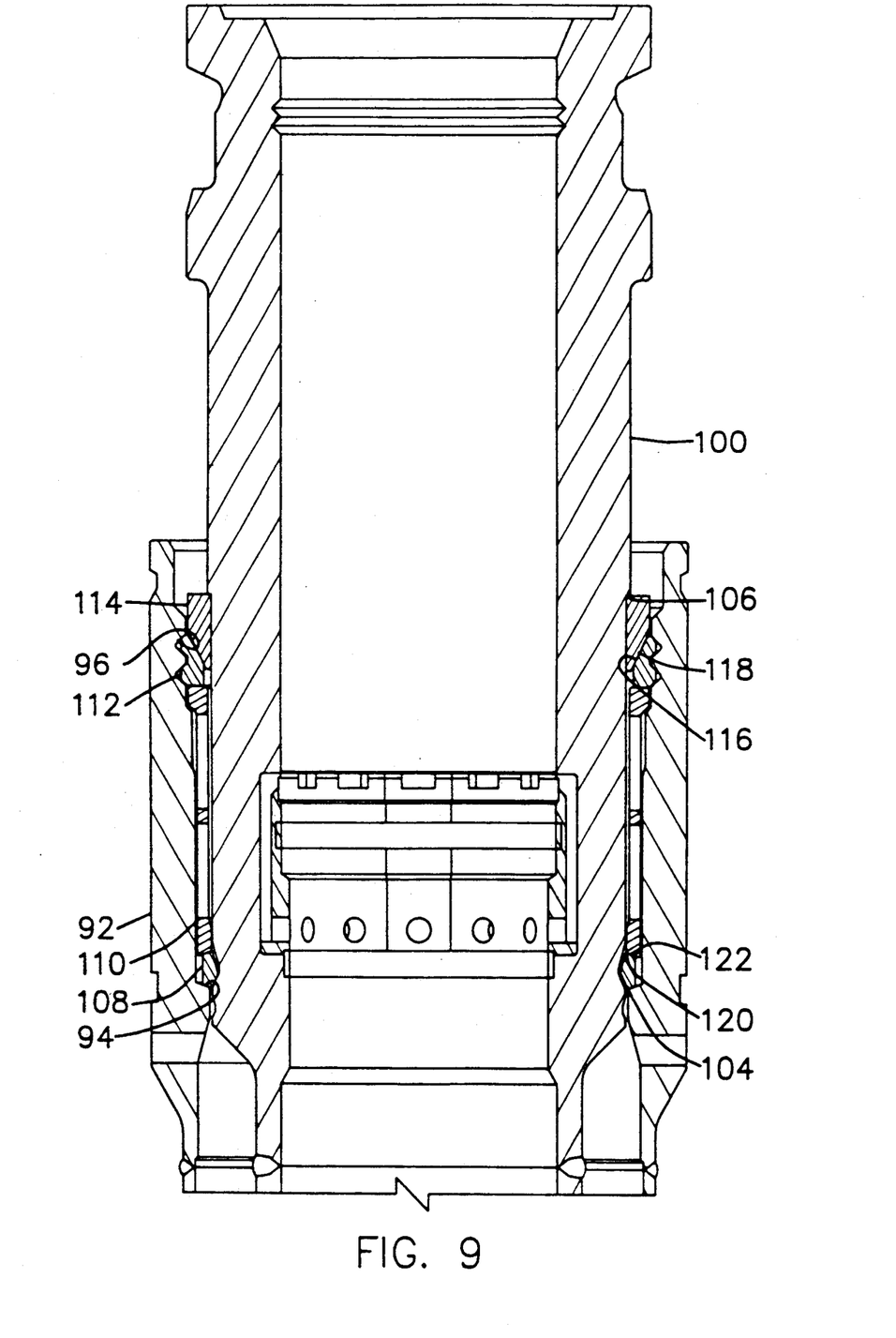
FIG. 9 is a similar sectional view of the mechanism of FIG. 8 after it has been landed and set in its locked position.
Figure 10:
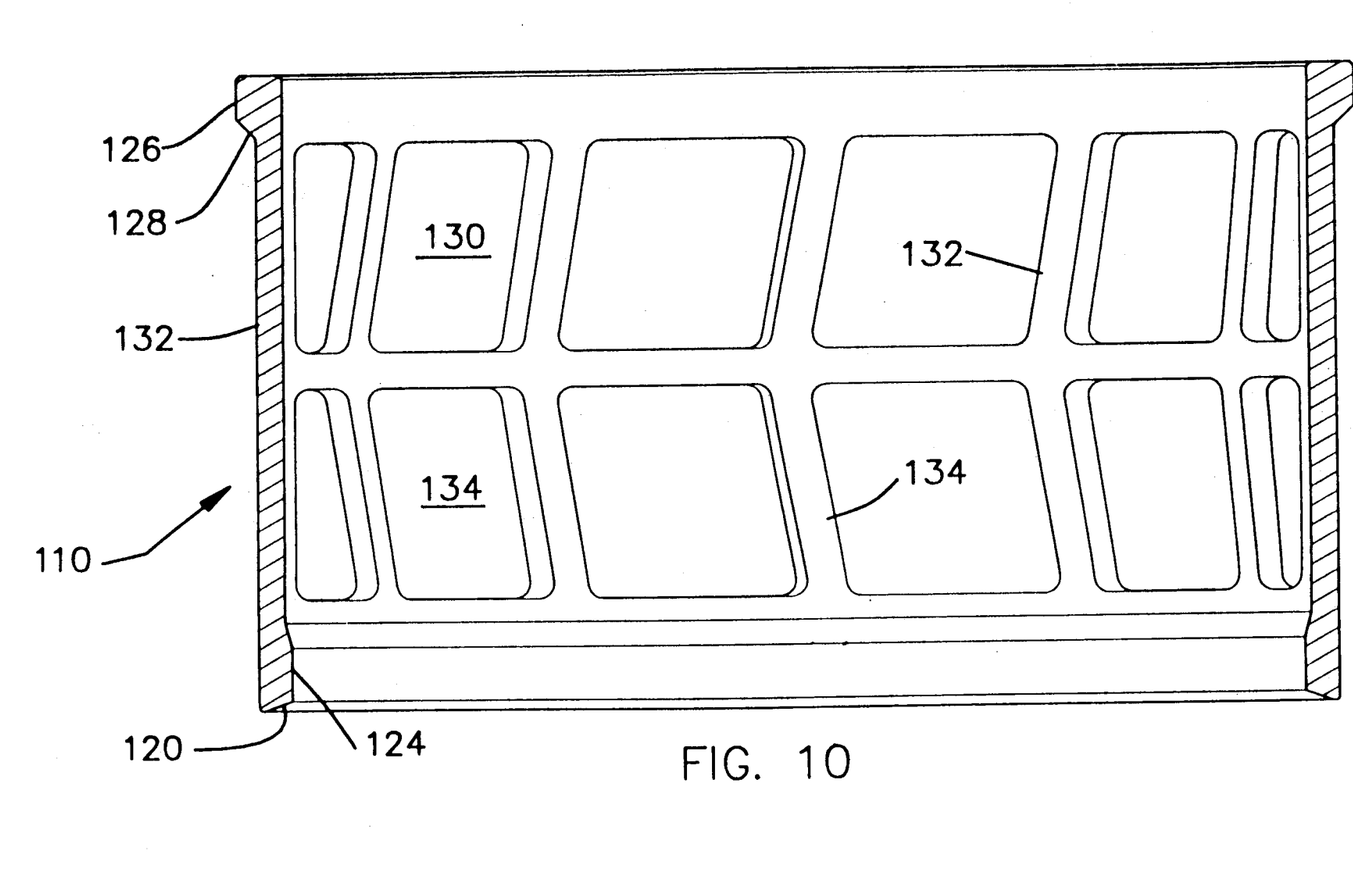
FIG. 10 is a sectional view of the landing and locking ring of the mechanism shown in FIGS. 8 and 9.

Another modified form of the present invention is illustrated in FIGS. 8, 9 and 10. In this form outer housing 92 includes the inner lower landing seat 94, upper internal profile 96 and upwardly facing shoulder 98 immediately below profile 96. Inner housing 100 includes first lower outer annular recess 102, second lower outer annular recess 104 immediately above recess 102, internal recess 105 and upper outer downwardly facing shoulder 106. High strength landing ring 107 is positioned in recess 105. During lowering, inwardly biased lower split landing ring 108 is positioned in engagement with first annular recess 102 in housing 100, support sleeve 110 is supported on split ring 108, inwardly biased split latching ring 112 is supported on the upper end of support ring 110 and wedge ring 114 is positioned in surrounding relationship to housing 100 in engagement with downwardly facing shoulder 106. In this position wedge ring 114 is positioned above split latching ring 112. It should be noted that split latching ring 112 has tapered upper inner surface 116 which tapers downwardly and inwardly and is adapted to mate with outer tapered surface 118 on wedge ring 114 which tapers downwardly and inwardly.

As shown in FIG. 10, support sleeve 110 is annular in shape and includes lower tapered surface 120 which mates with upper tapered surface 122 on split landing ring 108, lower inner projection 124 and upper outer projection 126 which defines downwardly facing outer shoulder 128. Upper slots 130 extend through body 132 of support sleeve 110 and are slanted circumferentially in one direction while lower slots 134 also extend through body 132 of support sleeve 110 but are slanted in the opposite direction from upper slots 130. Support sleeve 110 and in particular the slots 130 and 134 extending therethrough are designed so that sleeve 110 functions as a high strain compression sleeve. The strain is generated by elastic bending deflection of the residual material of the sleeve between the slots. The factors to be taken into consideration in this design to establish the desired force/strain relationship include the angle of the slots, their width and spacing, the wall thickness of the sleeve and the sleeve diameter and length. It should be noted that wedge ring 114 may be replaced by the wedging structure shown in FIGS. 5, 5A, 6 and 6A for wedging split latching ring 112 into engagement with profile 96, if secondary locking is desired.

During lowering of housing 100, the components are positioned as shown in FIG. 8. As shown in FIG. 9, when the lower surface of landing ring 108 engages landing seat 94 of housing 92, landing ring 108 is moved upwardly out of first lower annular recess 102 and into second annular recess 104. Split latching ring 112 rests on the upper surface of support sleeve 110 and is maintained at a level thereby so that it will interengage within profile 96 in the desired manner.

As the lowering of housing 100 continues, it moves downwardly through latching ring 112, sleeve 110 and landing ring 108 until wedge ring 114 is brought into engagement with latching ring 112 and wedges latching ring 112 outwardly into secure engagement within profile 96 in housing 92. The tapers on the engaging surfaces of profile 96 and latching ring 112 cause support sleeve 11 to be subjected to a compression load which forces ring 108 inwardly and downwardly against recess 104, inducing a tensile loading of housing 100 between recess 104 and shoulder 98 and a tensile loading of housing 92 between landing seat 94 and internal profile 96. With this structure the geometry and friction coefficients are such that the required ratio of preload to weight is achieved. The principle by which this mechanism achieves high preload is identical to the first modified form of the present invention discussed above.

As can be seen from the foregoing description, in each form of the present invention, the connection between the inner and outer tubular members or housings is provided and such connection provides the desired preloading. The structure of all forms allows the connection and preloading to be set without the use of supplemental hydraulic actuators but merely by manipulation of the inner member and substantially all of the loading results from the downward loading applied by the inner member.

What is claimed is:

1. A subsea well connecting mechanism for connecting an inner member within an outer member comprising an outer member having an upwardly facing member within an outer member comprising an outer member having an upwardly facing internal landing seat and a downwardly facing internal shoulder above the landing seat, an inner member having an outer, upwardly facing shoulder and means for engaging said outer member landing seat when said inner member is landed on said outer member to support said inner member therein, latching and loading means supported on the outer shoulder of said inner member and when said inner member is landed within said outer member in a position with the outer member supporting said inner member said latching and loading means engage said downwardly facing internal shoulder of said outer member with sufficient upward force to provide a preselected preload tension in said outer member, and said means for engaging said outer member landing seat comprising a landing shoulder on said inner member, said latching and loading means includes a plurality of fingers supported from said upwardly facing shoulder of said inner member, each of said fingers when seated on said inner member extending upwardly and outwardly and being of sufficient length to engage said downwardly facing inner shoulder on said outer member, said fingers have sufficient resilience to pass through the upper interior of said outer member above said downwardly facing inner shoulder and to spring back member upwardly and said outer, upwardly facing shoulder on said inner member downwardly to provide said tension preload in said outer member.

2. A mechanism according to claim 1 including means for securing said fingers to said inner member.

3. A mechanism according to claim 1 wherein the shape of said fingers taper upwardly to a thinnest portion at their upper end so that such shape is substantially the shape of a constant stress beam.

4. A mechanism according to claim 1 wherein said latching and loading means includes a ring supported on the exterior of said inner member and includes a lower inner projection and upper outer projection and means carried by said inner member for wedging the top of said ring outwardly into engagement with said inner downwardly facing shoulder on said outer member, said ring coacting with said two members to provide a landing surface for transmitting the landing forces between the two members, said upper outer projection on said ring when in wedging engagement with said inner downwardly facing shoulder on said outer member and said outer upwardly facing shoulder on said inner member creating an upward force on said shoulder to provide said desired preload in said inner and outer members.

5. A mechanism according to claim 4 wherein said ring is a serpentine type ring having sufficient resiliency to pass through the upper inner portion of said outer member and to be wedge into engagement with said downwardly facing internal shoulder to provide the desired preload.

6. A mechanism according to claim 5 including a pair of exterior recesses on said inner member including an upper recess and a lower recess with the upper recess forming said upwardly facing shoulder, said ring having a lower inner projection engaging within said lower recess during running of said inner member and moving upwardly into the upper recess when engaged by the inner landing shoulder of the outer member while said inner member continues to be lowered therethrough and with said ring being supported on said recess shoulder during the wedging of the upper portion of the ring into engagement with the downwardly facing internal shoulder of said external member.

7. A mechanism according to claim 4 wherein said ring includes a plurality of openings therethrough which provide it with sufficient resiliency to pass through the upper inner portion of said outer member and to be wedge into compressive engagement with said shoulder to provide the desired preload.

8. A mechanism according to claim 7 including a pair of exterior recesses on said inner member including an upper recess and a lower recess with the upper recess forming said upwardly facing shoulder, a split ring positioned in said lower recess and supporting said ring during running of said inner member and moving upwardly into the upper recess when engaged by the inner landing shoulder of the outer member while said inner member continues to be lowered therethrough, and upon moving into said upper recess, supports the lower end of said ring during the wedging of the upper portion of the ring into engagement with the downwardly facing internal shoulder in said outer member.

9. A mechanism according to claim 4 including a second wedge ring carried by said inner member to lock said ring in its preload position.

* * * * *